June 19, 1928.
M. PLASS
1,673,843
GOVERNOR
Filed April 7, 1922     2 Sheets-Sheet 1
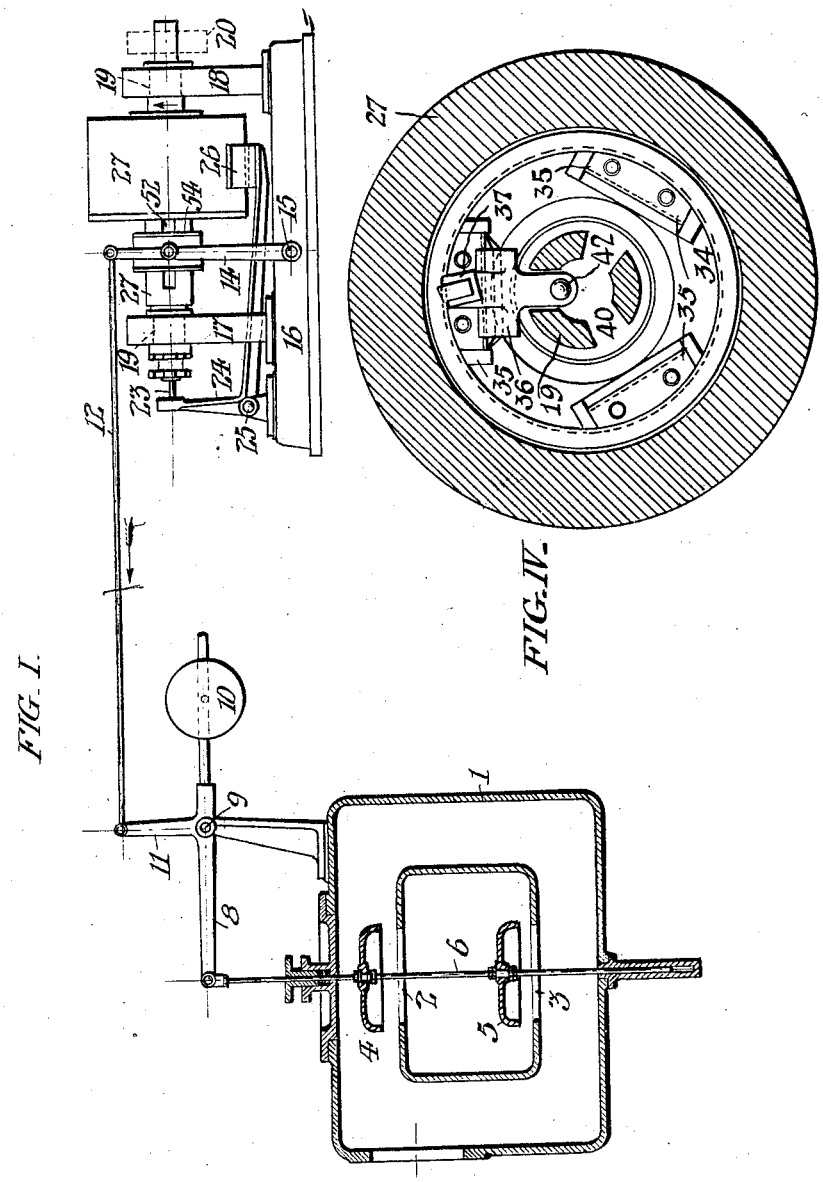
Inventor:
Martin Plass,
by Arthur E. Paige
Attorney

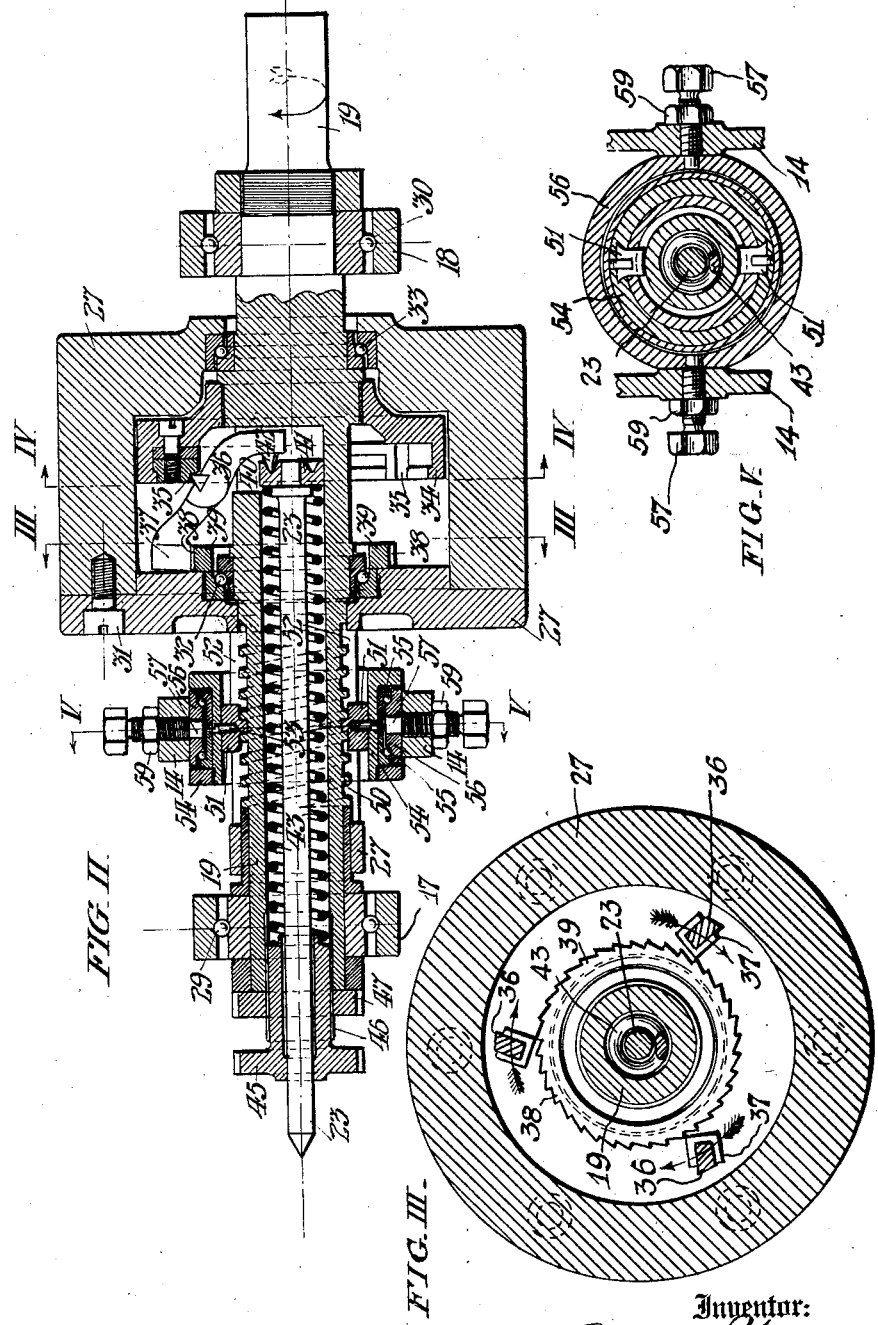

Patented June 19, 1928.

1,673,843

UNITED STATES PATENT OFFICE.

MARTIN PLASS, OF PHILADELPHIA, PENNSYLVANIA.

GOVERNOR.

Application filed April 7, 1922. Serial No. 550,413.

My invention relates to rotary governors, adapted to control the speed of engines by utilization of so-called centrifugal force. As ordinarily constructed and arranged, governors of that class include centrifugally movable weights balanced by other means, generally springs, so that a certain position of the weights corresponds with a certain opening of a power supply valve, and energy can only be delivered from the governor when that balance is disturbed. That is to say; for different openings of such valve, different speeds of the governor are required. Such construction and arrangement utilize only a small part of the centrifugal force developed and, consequently, such governors lack sensitiveness in that they fail to respond to slight variations in speed and are not very powerful in such response.

Therefore, the object and effect of my invention are to produce a governor more sensitive to changes in speed and capable of delivering more energy in proportion to such changes, than such devices of the prior art.

Briefly stated; the principle of operation of my invention is that a body, rotating freely on a shaft, will revolve with substantially constant angular velocity, for a sufficient time, due to its inertia, and the difference between the angular velocity of such a body and the angular velocity of such a shaft upon which it rotates, which is connected to the engine which is to be governed, is utilized to effect the desired governing movement. In other words, such governor shaft is arranged to positively rotate such inertia body up to the desired constant rate, predetermined by adjustment of the governor mechanism, and to then release said body, by the centrifugal effect consequent at that rate; whereupon, said body continues to rotate at substantially the same, constant, angular velocity, subject however, to slight fluctuations which are incident to the governing action; said body being reenegaged and again positively rotated up to that rate, whenever said governor shaft slows down below such constant rate; the arrangement being such that said inertia body may, at any time, turn faster than said shaft, but the shaft can only turn faster than said body after a certain velocity has been reached.

In a form of my invention hereinafter described; a governor is adapted to not only operate a valve controlling the admission of a motor fluid to an engine; but also a brake adapted to check the speed of rotation of the governor, and the engine, when the governor reaches a predetermined speed.

My invention includes the various novel features of construction and arrangement and method of operation hereinafter more definitely specified.

In said drawings; Fig. I shows a convenient embodiment of my invention operatively connected with a power supply valve, and arranged to automatically operate a brake device to check the speed of rotation of a governor.

Fig. II is a fragmentary longitudinal sectional view of the governor indicated in Fig. I.

Fig. III is a transverse sectional view of said governor, taken on the line III, III, and in the direction of the arrows indicated in Fig. II.

Fig. IV is a transverse sectional view of said governor, taken on the line IV, IV, and in the direction of the arrows indicated in Fig. II, but showing one of the pawl levers in elevation.

Fig. V is a fragmentary transverse sectional view taken on the line V, V, and in the direction of the arrows indicated in Fig. II.

Referring to Fig. I; 1 is a valve chest having ports 2 and 3 adapted to be closed by the puppet valves 4 and 5 which are coupled by the valve stem 6 and connected with the arm 8 of the bell crank lever which is fulcrumed at 9 and conveniently provided with the counterweight 10. The arm 11 of said bell crank lever is pivotally connected by the link 12 with the governor lever 14, which is fulcrumed at 15 upon the governor base frame 16. Said frame is provided with bearing standards 17 and 18 in which the governor shaft 19 is journaled. Said shaft is operatively connected, conveniently by the gear wheel 20, so as to be rotated in definite relation with the operation of the engine to which a motor fluid, such as steam or compressed air or a combustible mixture is admitted through said chest 1. The construction and arrangement are such that whereas, at normal predetermined speed said valves are held open, in the position shown; increase of speed of rotation of said shaft 19 causes said lever 14 to be shifted to the left, to move said link 12 in the direction of the arrow marked thereon and thus move said valves toward their respective seats and thus lessen the volume of motor fluid admitted through said ports and, consequently, lessen the speed of rotation of the engine to the predetermined normal. Simultaneously with such movement of said lever 14; the spindle 23, which is in coaxial relation with said shaft 19, is also shifted toward the left, relatively to said shaft and in engagement with the brake lever 24, which is fulcrumed at 25 upon said base 16, and with the effect of applying the brake shoe 26 in such frictional contact with the rotary body 27, hereinafter called the drum, as to thus automatically check the speed of rotation of the latter, when it reaches a predetermined speed.

As shown in Fig. II; said governor shaft 19 is provided with suitable ball bearings 29 and 30 which are respectively mounted in said bearing standards 17 and 18, and said rotary body 27 is a hollow drum conveniently formed of two pieces, detachably connected by screws 31. Said drum is mounted to rotate freely around said shaft 19, upon the ball bearings 32 and 33. The lever bearing ring 34 is rigidly connected with said shaft 19, and carries three knife edge bearings 35 in symmetrically spaced relation, as indicated in Fig. IV. Said bearings 35 respectively engage pawl levers 36, which have a tendency to fly radially outward from the position shown in Fig. II, when subjected to the so-called centrifugal force, generated by rotation of said shaft. The outer ends of said pawl levers 36 have heads 37 adapted to engage the teeth 38 of the ratchet ring 39 which is rigidly connected with said drum 27. It is to be understood that said shaft 19 is rotated in the direction of the arrows marked thereon in Figs. I and II, which shifts said levers 36 in the direction of the arrows marked thereon in Fig. III, with reference to said ratchet wheel, and it may be observed that said teeth 38 are so inclined as to prevent relative movement of said levers and ratchet wheel in that direction, unless and until said levers are shifted outwardly by the centrifugal force, far enough to clear said teeth, as in Fig. III.

As shown in Figs. II and IV; the inner ends of said levers 36 extend through respective radial slots 40 in said shaft 19. Said levers 36 are normally thrust into engagement with said ratchet teeth 38 by said spindle 23, which has the head 41 which engages the cone points 42 at the inner ends of said levers 36 and is pressed toward them by the spring 43. Said spring 43 encircles said spindle 23 in coaxial relation with said shaft 19 and abuts at its outer end against the bushing 45 which has the screw thread 46 engaging said shaft and is axially adjustable therein to determine the effective pressure of said spring 43 upon said levers 36. Said abutment bushing 45 is provided with the jam nut 47, to clamp it in adjusted position.

Of course, the arrangement above described permits precise balancing by said spring 43, of the so-called centrifugal force which tends to disengage said levers 36 from said ratchet teeth 38 when said shaft 19 is rotated; so that the speed at which said levers 36 are disengaged from said teeth 38, so as to permit relative movement thereof in the direction of the arrows shown in Fig. III, may be precisely predetermined.

In order that the relative movement of said shaft 19 and rotary body 27, which is thus effected when the rotation of said shaft exceeds the predetermined normal speed, may be applied to shift said lever 14, as above described; I provide said shaft 19 with the double screw thread 50 which, as shown in Figs. II and V, is engaged by the diametrically opposite nut blocks 51 which are fitted to slide longitudinally in the radial slots 52 in said body 27, and are respectively connected by pivots 53 with the collar 54 which is mounted to turn freely, upon the roller bearings 55, in the lever ring 56; which ring 56 is hung upon the diametrically opposite pivot screws 57 which are locked in said lever 14 by the jam nuts 59.

It may be observed that the aforesaid adjustment of the effective pressure of said spring 43 also predetermines the speed at which said brake 26 is applied to said rotary body 27, by the axial movement of said spindle 23.

It is to be understood that the effect of such relative movement of said shaft 19 and rotary body 27, which is thus occasioned by the increment of speed of said shaft above the predetermined normal, is to check such increment and slow down the shaft to the normal speed, whereupon, the governor parts are restored to their initial position in which said shaft 19 is again operatively connected with said rotary body 27, to turn the latter, by engagement of said pawl levers 36 with said ratchet ring 39.

Of course, when said governor shaft 19 is rotated in the direction of the arrow marked thereon in Fig. II, with said levers 36 engaged with said ratchet ring 39; said shaft 19 and rotary body 27 revolve with the same angular velocity. However, if and when the speed of said shaft 19 becomes so high that the effective pressure of said spring 43 can no longer counteract the so-called centrifugal force tending to throw said levers 36 out of engagement with said ratchet ring 39, and they are disengaged; then said rotary body 27 is released to rotate freely relatively to said shaft 19, but, by reason of its inertia, it will continue to rotate at substantially the same angular velocity, for a sufficient time, and until checked by the above described operation of the brake 26, regardless of the increased angular velocity of said shaft 19, and the movement of said lever 14, to the left, is then effected by the relative rotary movement of said shaft 19 in said body 27, as above described. Of course, such movement of said lever 14 stops when the angular velocity of said shaft 19 is again equal to that of said body 27. However, at any and every rate of rotation of the governor, if the angular velocity of said shaft 19 decreases until it is less than the angular velocity of said body 27; there is a relative rotary movement thereof, in the reverse direction, causing the ratchet teeth 38 to slide from under said levers 36, in the direction of the arrow shown in Fig. III, with consequent reverse axial movement of said nut blocks 51 and corresponding movement of said lever 14 to the right in Fig. I to thus open the power supply valve until the speed of rotation of said shaft 19 is again restored to the predetermined normal, and equal to the normal angular velocity of rotation of said body 27, which it then again positively rotates by the engagement of said pawl levers 36 with said ratchet teeth 38.

Of course, the sensitiveness of the governor mechanism above described would depend upon the resistance of the valve mechanism to movement, in proportion to the mass of said rotary body 27. However, the sensitiveness of said governor mechanism is rendered independent of the resistance of said valve mechanism by the counterbalancing means 10 above described. Of course, such counterbalancing means may be omitted.

Moreover, although I have found it convenient to illustrate the operation of my invention with reference to a valve mechanism; it is to be understood that it may be otherwise constructed, arranged and utilized.

Therefore, I do not desire to limit myself to the precise details of construction and arrangement herein set forth, as it is obvious that various modifications may be made therein without departing from the essential features of my invention, as defined in the appended claims.

I claim:

1. In an engine governor; the combination with a rotary shaft adapted to be turned by the governed engine; of a rotary inertia body; clutch means between said shaft and body, adapted to turn said body by said shaft until a certain predetermined rate of rotation is attained, and including normally interengaged means adapted to release by centrifugal force and then permit said body to continue to turn, freely, when said shaft turns slower than said body; and valve means adapted to be operated by relative movement of said shaft and body, to regulate the speed of operation of said engine and body.

2. In an engine governor; the combination with a shaft driven by the engine; of a rotary body arranged to rotate at predetermined regulated speed; and rotary clutch means operatively connecting said shaft and body, arranged to interengage by relative movement in one direction and disengage by relative movement in the opposite direction; whereby said body is always free to rotate faster than said shaft, and said shaft may be freed to rotate faster than said body, after a predetermined speed of rotation is attained.

3. In an engine governor; the combination with a shaft driven by the engine; of a rotary body arranged to rotate at predetermined regulated speed; and rotary clutch means operatively connecting said shaft and body, including centrifugally movable pawls, and a circular ratchet adapted to be engaged by said pawls whereby said body is always free to rotate faster than said shaft, and said shaft may be freed to rotate faster than said body, after a predetermined speed of rotation is attained.

4. In an engine governor; the combination with a shaft driven by the engine; of a rotary body arranged to rotate at predetermined regulated speed; and rotary clutch means operatively connecting said shaft and body, including centrifugally movable levers, carried by said shaft, and a circular ratchet, carried by said rotary body; whereby said body is always free to rotate faster than said shaft, and said shaft may be free to rotate faster than said body, after a predetermined speed of rotation is attained.

5. A governor mechanism as described in claim 1; combined with a brake for the rotary body and means arranged to operate said brake by relative movement of said shaft and an axially movable body.

6. A governor mechanism as described in claim 1, with an axially movable spindle operatively connected with said clutch means and a brake operatively connected with said spindle and arranged to check the rotation of said body.

7. In an engine governor; the combination with a rotary shaft adapted to be turned by the governed engine; of a rotary inertia body; a rotary, one way clutch means between said shaft and body, including a circular ratchet and a pawl to turn said body by said shaft until a certain predetermined rate of rotation is attained, and including centrifugally operative means adapted to release said pawl from said ratchet and permit said body to continue to turn, freely, when said shaft turns slower than said body; and valve means adapted to be operated by relative movement of said shaft and body, to regulate the speed of operation of said engine and body.

8. In an engine governor; the combination with a shaft driven by the engine; of a rotary inertia body journaled on said shaft in coaxial relation therewith; means preventing relative axial movement of said shaft and rotary body; clutch means between said shaft and body adapted to turn said body by said shaft in rigid relation therewith; a screw thread carried by said shaft; a nut element carried by said rotary body, adapted to move axially with respect to said body and shaft but with means preventing its rotation relatively to said body; and valve means operatively connected with said nut; whereby said valve means is operated by the movement incident to the difference in angular velocity of said shaft and rotary body.

9. In an engine governor; the combination with a shaft driven by the engine; of a rotary inertia body journaled on said shaft in coaxial relation therewith; means preventing relative axial movement of said shaft and rotary body; clutch means between said shaft and rotary body, including a circular ratchet carried by said rotary body and a pawl carried by said shaft to turn said body by said shaft; a screw thread carried by said shaft; a nut element carried by said rotary body, adapted to move axially with respect to said body and shaft but with means preventing its rotation relatively to said body; and valve means operatively connected with said nut; whereby said valve means is operated by movement incident to the difference in angular velocity of said shaft and rotary body.

10. A governor mechanism including a rotary shaft, shaft turning means a rotary body capable of revolving at substantially constant speed but free to rotate idly faster than said shaft; and means arranged to be intermittently actuated by said shaft to turn said body with said shaft, and means arranged to control said shaft turning means by turning movement of said body relatively to said shaft; means arranged to coordinate said shaft and body to turn with the same angular velocity at a given speed; and means responsive to change in speed of said shaft to occasion relative movement of said shaft and body and thereby cause said shaft to resume said given speed; whereby the speed of rotation of said shaft is governed by using difference in angular velocity of said shaft and body.

11. A governor mechanism as in claim 10, wherein the rotary body is in coaxial relation with the shaft.

12. A governor mechanism as in claim 10, and brake means applicable to said body and arranged to check the speed of rotation of said body upon relative movement of the latter faster than said shaft.

13. A governor mechanism as in claim 10, including braking means and means arranged to vary the power applied to said shaft and apply a brake to said body and operative by relative rotation of said body faster than said shaft.

14. A governor mechanism as in claim 10, including braking means and means arranged to vary the power applied to said shaft, within a predetermined range, and to apply a brake to said body when that range is exceeded.

15. A governor mechanism as in claim 10, including means arranged to intermittently connect said shaft with said body to effect rotation of said body; with continual freedom of said body to rotate idly faster than said shaft.

In testimony whereof, I have hereunto signed my name at Philadelphia, Pennsylvania, this fourth day of April, 1922.

MARTIN PLASS.